(12) United States Patent
Sata

(10) Patent No.: US 6,323,895 B1
(45) Date of Patent: Nov. 27, 2001

(54) IMAGE GENERATING SYSTEM AND INFORMATION STORAGE MEDIUM CAPABLE OF CHANGING VIEWPOINT OR LINE-OF SIGHT DIRECTION OF VIRTUAL CAMERA FOR ENABLING PLAYER TO SEE TWO OBJECTS WITHOUT INTERPOSITION

(75) Inventor: Hironori Sata, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/095,151

(22) Filed: Jun. 10, 1998

(30) Foreign Application Priority Data

Jun. 13, 1997 (JP) .................................................. 9-173155

(51) Int. Cl.$^7$ ...................................................... H04N 7/18
(52) U.S. Cl. ................................................................ 348/39
(58) Field of Search .................................. 348/39, 42, 47, 348/48; H04N 7/18

(56) References Cited

U.S. PATENT DOCUMENTS

| 6,154,251 | * | 11/2000 | Taylor | ................................... 348/159 |
| 6,233,004 | * | 5/2001 | Tanaka et al. | .......................... 348/48 |
| 6,259,470 | * | 7/2001 | Koizumi et al. | ........................ 348/47 |

FOREIGN PATENT DOCUMENTS

| A-7-116343 | 5/1995 | (JP) . |
| A-7-244747 | 9/1995 | (JP) . |
| A-8-292720 | 11/1996 | (JP) . |
| A-9-50541 | 2/1997 | (JP) . |

* cited by examiner

Primary Examiner—Howard Britton
(74) Attorney, Agent, or Firm—Oliff & Berridge, PLC

(57) ABSTRACT

An image generating system and information storage medium which can generate an image preferable for the game play while causing a virtual camera to follow a displayed object. While the virtual camera follows a player's game character, the viewpoint and line-of-sight direction of the virtual camera are changed so that the player's game character and ball can be displayed without hiding each other even if the distance D between the player's game character and the ball is changed. Depending on the distance D, the viewpoint, twist angle and pan angle of the virtual camera are changed. If the distance D is smaller than a given value $D_{th}$, the ball is displayed so that it can be seen through an open space of the player's game character. The change of the line-of-sight direction is limited to a given range. The player's game character and ball are always projected onto a screen below and above the gazing point, respectively. The first and second displayed objects represent first and second characters in a fighting game or a character and item in a role-playing game, respectively.

29 Claims, 14 Drawing Sheets

IMAGE GENERATING SYSTEM AND INFORMATION STORAGE MEDIUM CAPABLE OF CHANGING VIEWPOINT OR LINE-OF SIGHT DIRECTION OF VIRTUAL CAMERA FOR ENABLING PLAYER TO SEE TWO OBJECTS WITHOUT INTERPOSITION

BACKGROUND OF THE INVENTION

1. Field of the Invention

The present invention relates to an image generating system for generating an image as seen from a virtual camera in an object space and an information storage medium used in this image generating system.

2. Prior Art

There is known an image generating system which generates images of objects as seen from a virtual camera when the objects are arranged within a virtual three-dimensional space or an object space. Such a system is very popular because of providing a so-called virtual reality.

With such image generating system used in a soccer simulation game, for example, a player enjoys controlling a game character on a screen who passes a ball or kicks a goal. By using this image generating system, the player feels as if he/she were actually playing soccer.

In the conventional soccer simulation games, a game character which is controllable by a player is not fixed, and may be a game character that keeps a ball, for example. More particularly, when the player controls a first game character and then passes a ball to a second game character, the player's game character is changed from the first game character to the second game character. For such a reason, the virtual camera does not follow one fixed character.

However, such a soccer simulation game according to the prior art has the following problems.

First of all, the player must do a complicated control since a game character controlled by the player is frequently changed from one to another during the game play. Game beginners tend to avoid such a complicated game.

Second, the player cannot easily feel strong affection for his or her game character or enthusiasm about the game. In such a type of simulation games, game characters are often modeled on actual star players. However, if there is a game character modeled on the player's favorite soccer star, the player cannot always control the game character in a conventional simulation game in which the player's controllable game character is frequently changed. Thus it is difficult to feel strong affection for the player's game character and enthusiasm about the game.

Thus, the conventional soccer simulation games are disadvantageous in that the player's game character is frequently changed and that the virtual camera does not follow one fixed player's game character.

Therefore, the inventor has developed a soccer simulation game of such a type that the player's game character is fixed to a particular one and that the virtual camera follows that fixed character. In such a soccer simulation game wherein the virtual camera follows one fixed player's game character, it is desirable that an image preferable for the game play can be generated in real time when the positional relationship between the player's game character and the ball is varied.

SUMMARY OF THE INVENTION

To overcome the aforementioned problems, an object of the present invention is therefore to provide an image generating system and information storage medium which can generate an image preferable for the game play while enabling the virtual camera to follow a displayed object.

According to the present invention, there is provided an image generating system for generating an image as seen from a virtual camera in an object space in which at least first and second displayed objects are disposed, the image being a projected image onto a screen, the image generating system comprising:

means for causing the virtual camera to follow the first displayed object, and also for changing at least one of the viewpoint and line-of-sight direction of the virtual camera based on positional information of the first and second displayed objects such that the first and second displayed objects are projected onto the screen without hiding each other even if the distance between the first and second displayed objects is changed; and means for generating an image as seen from the virtual camera.

The image as seen from the virtual camera which follows the first displayed object is thus generated. In such a case, the virtual camera may follow the first displayed object with inertia. Even if the distance between the first and second objects is changed, the projected image is so generated that the first and second objects can be displayed without hiding each other. Therefore, the second displayed object is not hidden by the first displayed object when the second displayed object is close to the first displayed object. Thus, the player will not lose enthusiasm for the game and an image preferable for the game play can be generated.

As the distance between the first and second displayed objects decreases, the viewpoint of the virtual camera may be changed to increase the distance between the viewpoint and a line passing through the first and second displayed objects, and also the line-of-sight direction of the virtual camera may be directed toward the first and second displayed objects side. In this way, the projected image can be generated such that the first and second displayed objects will not hide each other or both the first and second displayed objects will always visible.

When the object space has a coordinate system in which the X-axis, Y-axis and Z-axis are perpendicular to each other, the Y-coordinate of the viewpoint of the virtual camera and a twist angle which is an angle between the line-of-sight direction of the virtual camera and the plane XZ may be changed depending on the distance between the first and second displayed objects. Alternatively, the Z-coordinate of the viewpoint of the virtual camera and a pan angle which is an angle between the line-of-sight direction of the virtual camera and the plane XY may be changed depending on the distance between the first and second displayed objects.

At least one of the viewpoint and line-of-sight direction of the virtual camera may be changed such that the second displayed object can be seen through an open space of the first displayed object when the distance between the first and second displayed objects is less than a given threshold value. In this way, a realistic three-dimensional image can be provided to the player even if the distance between the first and second objects is smaller than the threshold value.

Changing of the line-of-sight direction of the virtual camera may be limited to a given range. It can effectively be avoided that an unnatural image or an image which confuses the player is displayed on the screen.

As least one of the viewpoint and line-of-sight direction of the virtual camera may be changed such that the first displayed object is projected onto a first part of the screen and the second displayed object is projected onto a second part of the screen when a gazing point of the virtual camera is used as a reference point to divide the screen into the first and second parts. In this way, an image can be generated such that the first and second displayed objects will not hide each other or both the first and second displayed objects are always visible. Further, the positional relationship between the gazing point and the first and second displayed objects can be maintained stable. This can generate an image preferable for the game play.

The virtual camera may follow the first displayed object with inertia. According to this, images can be smoothly displayed even if the position or direction of the first displayed object is rapidly changed.

The first displayed object may represent a game character and the second displayed object may represent a ball controllable by the game character in a game which is played by using the image generated by the image generating system. In this way, an image preferable for a sports simulation game using a ball can be generated.

Moreover, the first displayed object may represent a first game character and the second displayed object may represent a second game character who fights against the first game character in a game which is played by using the image generated by the image generating system. In this way, an image preferable for a fighting game in which the first and second game characters fight with each other can be generated.

Furthermore, the first displayed object may represent a game character and the second displayed object may represent an item to be obtained by the game character in a game which is played by using the image generated by the image generating system. In this way, an image preferable for a role-playing game in which the game character travels in a map for the item can be generated.

DESCRIPTION OF PREFERRED EMBODIMENT

A preferred embodiment of the present invention will now be described with reference to the drawings.

First of all, the characteristics of the present embodiment are described. Although the present invention is applied to a soccer simulation game in this embodiment, a game to which the present invention can be applied is not limited to it.

The present embodiment is directed to provide a system for generating an image in which a player controls only one fixed game character which is followed by a virtual camera.

Figure 1:
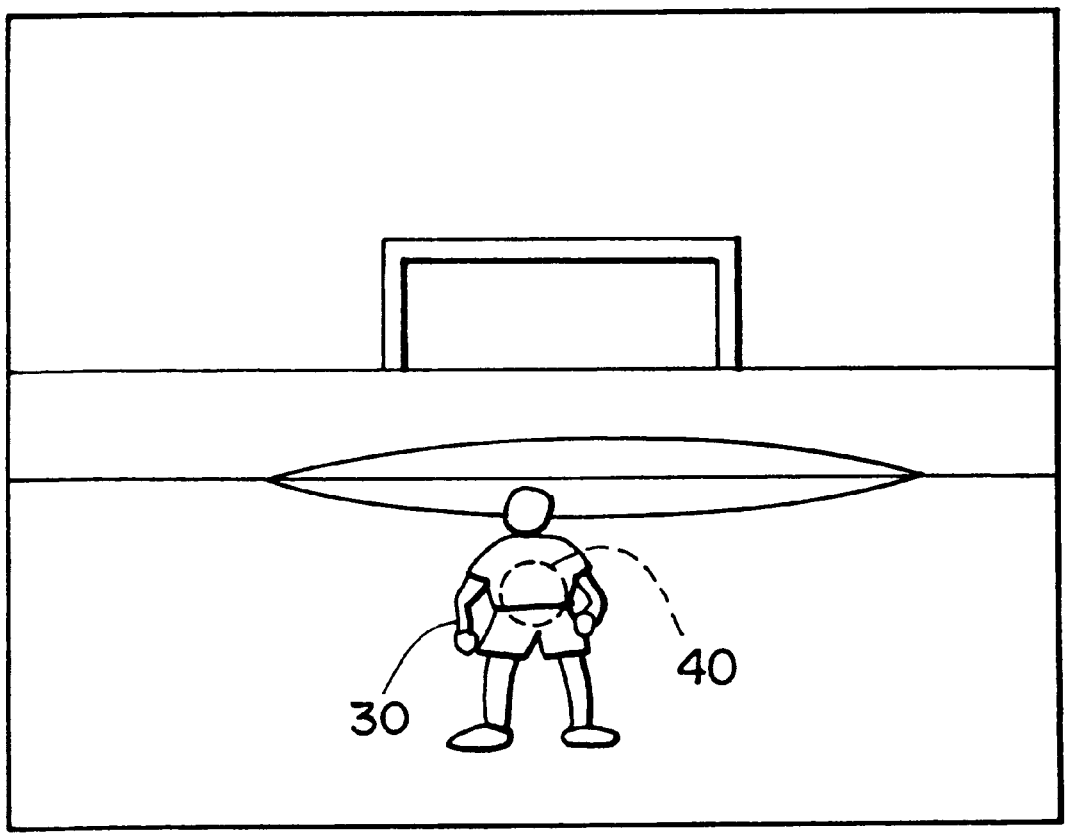
FIG. 1 is a view illustrating a situation that the ball is hidden by the player's game character.

However, it has been found that such a technique that the virtual camera follows a fixed player's game character raised such a problem as shown in FIG. 1. Particularly, when the distance between a player's game character 30 and a ball 40 is relatively short, the player's game character 30 often interposes between the ball 40 and the virtual camera to hide the ball 40 from the player's view. This invites the player's confusion. Generally, a player enjoys such a soccer simulation game by controlling a ball skillfully through a player's game character. If the player cannot see the ball 40 as shown in FIG. 1, therefore, the player may lose his or her enthusiasm or interest in the game.

Figure 2A:
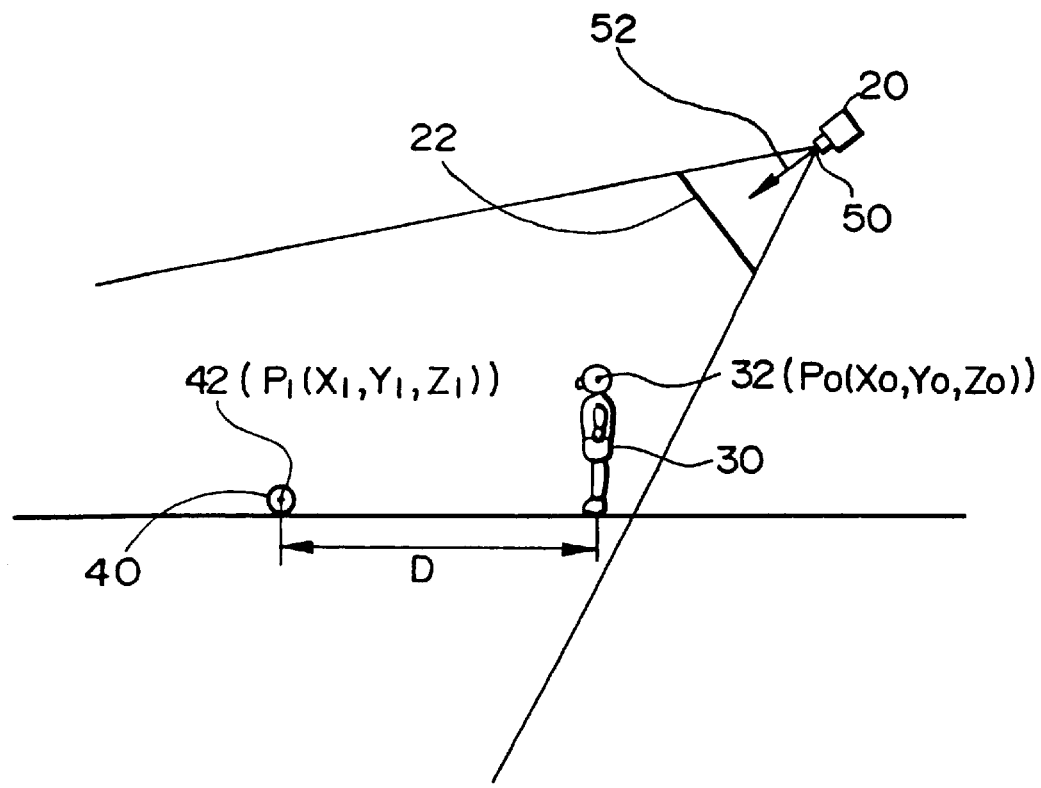
FIGS. 2A and 2B illustrate the principle of the present embodiment.
Figure 2B:
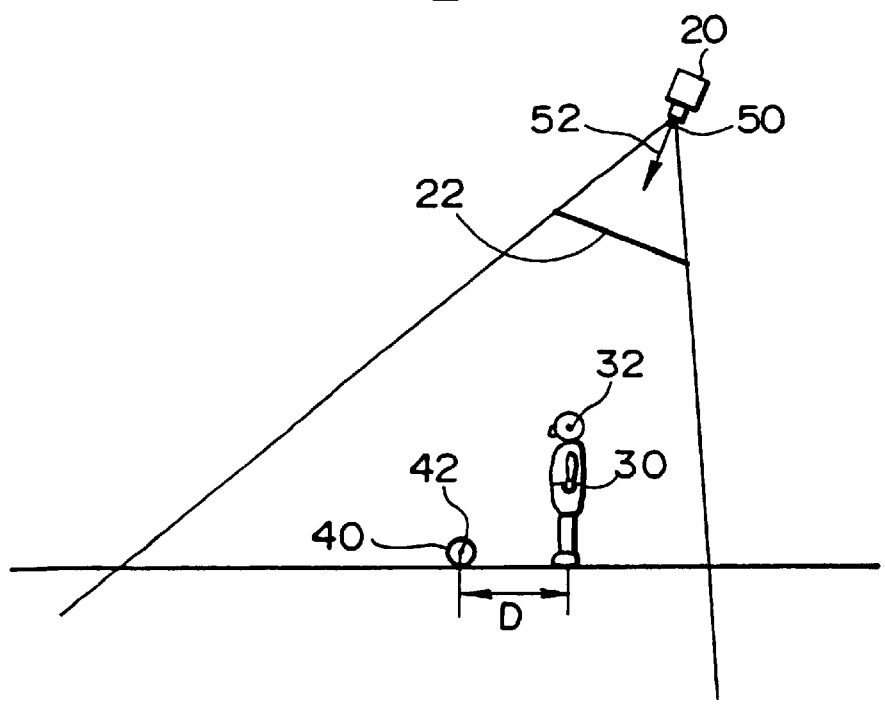

To solve this problem, at least one of a viewpoint 50 and line-of-sight direction 52 of the virtual camera 20 is changed depending on the distance D between the player's game character 30 and the ball 40, as shown in FIGS. 2A and 2B. In this way, both the player's game character 30 and the ball 40 can be reliably projected onto a screen 22. The viewpoint 50 and the line-of-sight direction 52 are determined based on the positional information of the player's game character 30 and the ball 40, or based on coordinates $P_0$ of a representative pint 32 of the player's game character 30 (hereafter it is called the coordinates $P_0$ of the player's game character 30 for short) and coordinates $P_1$ of a representative point 42 of the ball 40 (hereafter it is called the coordinates $P_1$ of the ball 40 for short), for example.

When the distance D between the player's game character 30 and the ball 40 is relatively long, the viewpoint 50 is shifted downward while the line-of-sight direction 52 is directed away from the player's game character 30 and ball 40 side. On the other hand, when the distance D is relatively short, the viewpoint 50 is shifted upward while the line-of-sight direction 52 is directed toward the player's game character 30 and ball 40 side.

Figure 3A:
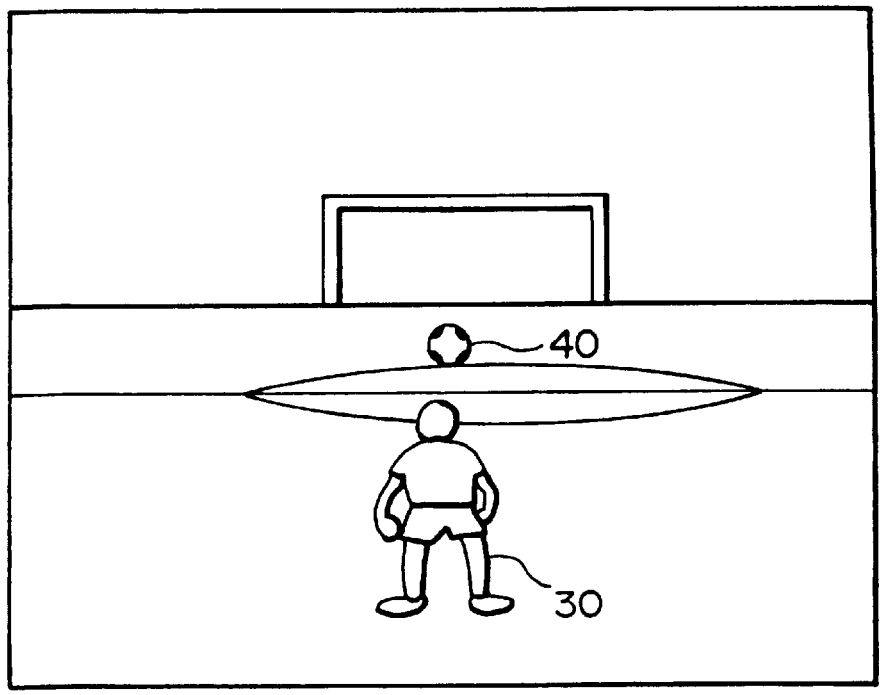
FIGS. 3A and 3B show images generated according to the present embodiment.
Figure 3B:
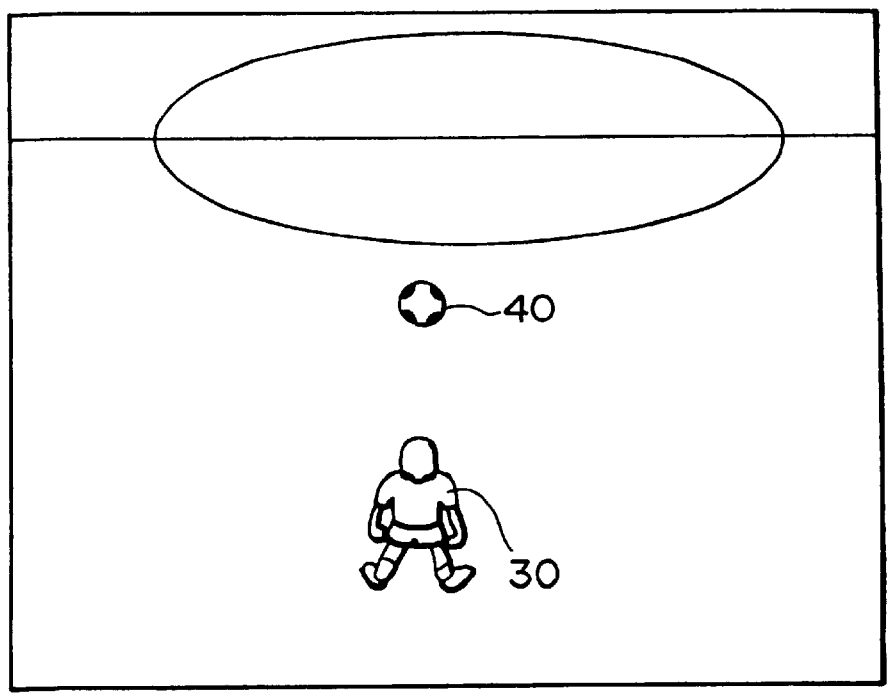

FIG. 3A shows an image generated when the distance D between the player's game character 30 and the ball 40 is relatively long while FIG. 3B shows an image generated when the distance D is relatively short. Although the ball 40 is hidden by the player's game character 30 in the case of FIG. 1, it will not occur in FIGS. 3A and 3B. The player can always view both the player's game character 30 and ball 40 irrespective of the distance D between the player's game character 30 and the ball 40. As a result, the player will not lose sight of the ball 40 even if it is near the player's game character 30 or by his or her foot. Thus, the player can maintain enthusiasm for the game.

It is a special feature of the present embodiment that the viewpoint 50 and line-of-sight direction 52 of the virtual camera 20 are changed depending on the coordinates $P_0$ and $P_1$ of the player's game character 30 and ball 40.

There may be considered such a technique that the viewpoint 50 and line-of-sight direction 52 are changed only to give a special effect on the game, independent of the coordinates of the player's game character 30 and ball 40. The present embodiment is different from this technique in that the viewpoint 50 and line-of-sight direction 52 are changed in real time based on the coordinates $P_0$, $P_1$ of the player's game character 30 and the ball 40 which are changed in real time by the player's control in this embodiment. The coordinates $P_0$ of the player's game character is changed depending on the control by the player. Similarly, the coordinates $P_1$ of the ball 40 is also changed in real time depending on various conditions: the coordinates $P_0$ of the player's game character 30; whether the player's game character 30 is keeping the ball 40; whether the player's game character has kicked the ball 40; the direction of the ball 40 kicked by the player's game character 30; whether the other game character is keeping the ball 40; and so on. It is characteristic of the present embodiment that the viewpoint 50 and the line-of-sight direction 52 are changed in real time based on the coordinates $P_0$, $P_1$ which also changes.

The coordinates $P_0$, $P_1$ are information required to generate a three-dimensional image. Generation of a three-dimensional image is accomplished by determining the coordinates $P_0$, $P_1$ within the object space in real time, arranging displayed objects in the object space based on the determined coordinates $P_0$, $P_1$ and generating an image through a perspective transformation. Since the coordinates $P_0$, $P_1$ are determined in real time to generate the three-dimensional image, we utilize these coordinates to change the viewpoint 50 and line-of-sight direction 52 in real time. Accordingly, the coordinates $P_0$, $P_1$ will more effectively be utilized in the present invention.

In the present embodiment, the virtual camera 20 follows the player's game character 30 with inertia. Even if the player's game character 30 is rapidly changed in position or direction, the virtual camera 20 can slowly follow the player's game character 30 with some degree of inertia. Thus, images can be smoothly displayed.

Figure 4A:
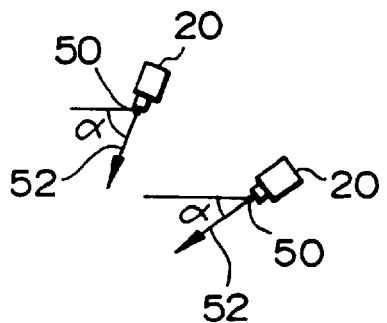
FIGS. 4A and 4B illustrate a technique by which the viewpoint and line-of-sight direction of the virtual camera are changed.
Figure 4A:
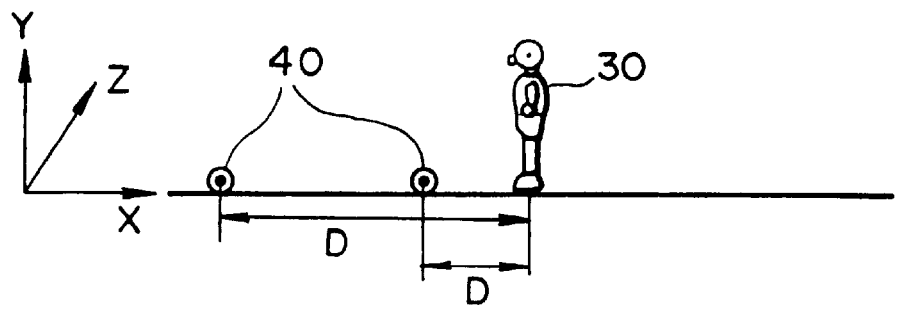

The second feature of the present embodiment is that as the distance D between the player's game character 30 and the ball 40 decreases, the viewpoint 50 is changed such that the distance between the viewpoint and a line which passes through the player's game character 30 and ball 40 increases while the line-of-sight direction 52 is directed toward the player's game character 30 and ball 40 side, as shown in FIG. 4A. If the distance D decreases, the viewpoint 50 is shifted upward, for example, while the line-of-sight direction 52 is directed toward the player's game character 30 and ball 40 side.

As shown in FIG. 4A, the Y-coordinate of the viewpoint 50 (in the X-Y-Z coordinate system of the object space) is changed depending on the distance D, while a twist angle α which is an angle between the line-of-sight direction 52 and the plant XZ is also changed depending on the distance D. When the distance D decreases, the Y-coordinate of the viewpoint 50 increases and the twist angle α increases (when it is assumed that the value α increases counter-clockwise).

Figure 4B:
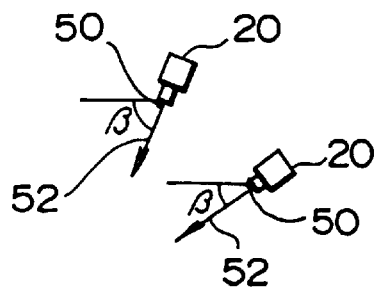
Figure 4B:
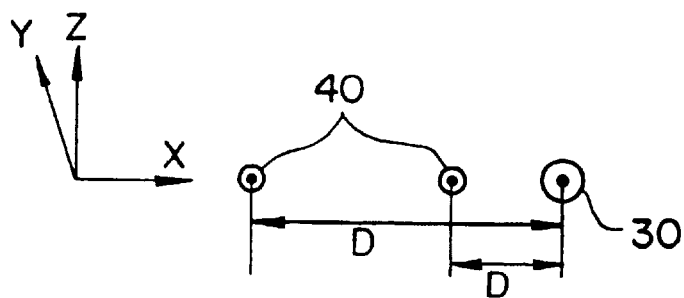

However, the technique in which the viewpoint 50 and line-of-sight direction 52 are changed is not limited to such a technique as shown in FIG. 4A. In FIG. 4B, for example, the Z-coordinate of the viewpoint 50 is changed depending on the distance D while a pan angle β which is an angle between the line-of-sight direction 52 and the plane XY is also changed depending on the distance D. If the distance D decreases, the Z-coordinate of the viewpoint 50 increases and the pan angle β also increases (when it is assumed that the value β increases counter-clockwise).

The third feature of the present embodiment is that when the distance D between the player's game character 30 and the ball 40 becomes smaller than a given threshold value, the viewpoint 50 and line-of-sight direction 52 of the virtual camera 20 are changed such that the ball 40 can be viewed through an open space of the player's game character 30.

Figure 5A:
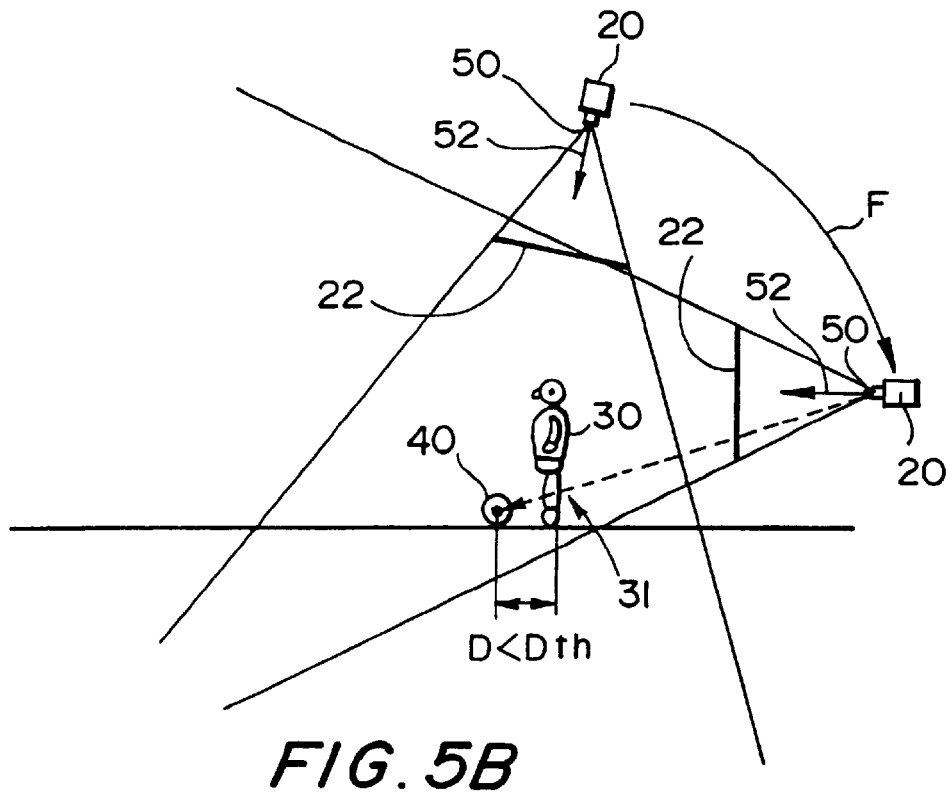
FIGS. 5A and 5B illustrate a technique by which the ball can be seen through the open space of the player's game character when the distance between the player's game character and the ball is smaller than the threshold value.
Figure 5B:
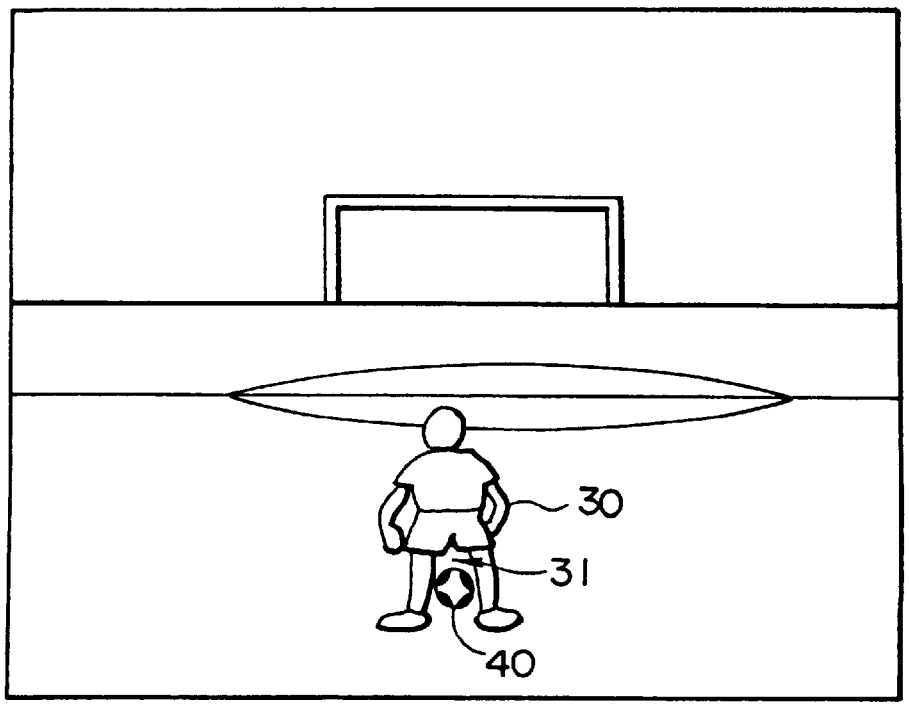

Particularly, when the distance D is smaller than a threshold value $D_{th}$, the viewpoint 50 and line-of-sight direction 52 are changed as shown by F in FIG. 5A such that the ball can be viewed through the open space 31 between the legs of the player's game character 30. An image generated in such a case is shown in FIG. 5B.

As shown in FIGS. 2A and 2B, the viewpoint 50 moves upward and the line-of-sight direction 52 is directed toward the player's game character 30 and ball 40 side (or the twist angle increases) as the distance D decreases. Therefore, an image generated at such a time is one that is observed from an upward position, as shown in FIG. 3B. For example, if the distance D becomes zero, the image is one that is observed from right above. Such an image often looks like a two-dimensional image.

The player usually feels enthusiasm for the game when the player's game character 30 keeps the ball 40. At this time, the distance D is relatively short. If the game image unexpectedly looks like a two-dimensional image in this time, the player who plays the game for a realistic three-dimensional image may lose interest in the game.

The inventor found that there is an open space 31 between the legs of the player's game character 30. In the present embodiment, the viewpoint 50 and line-of-sight direction 52 are changed such that the ball 40 can be viewed through the open space 31 when the distance D is smaller than the threshold $D_{th}$. Particularly, when the distance D is smaller than the threshold $D_{th}$, the viewpoint 50 is moved downward while the line-of-sight direction 52 is directed approximately along the horizontal direction. In this way, during the player's game character 30 keeps the ball 40, a realistic three-dimensional image as shown in FIG. 5B can be provided. Accordingly, the player can easily feel enthusiasm for the game.

The fourth feature of the present embodiment is that changing of the line-of-sight direction 52 of the virtual camera 20 is limited to a given range.

Figure 6A:
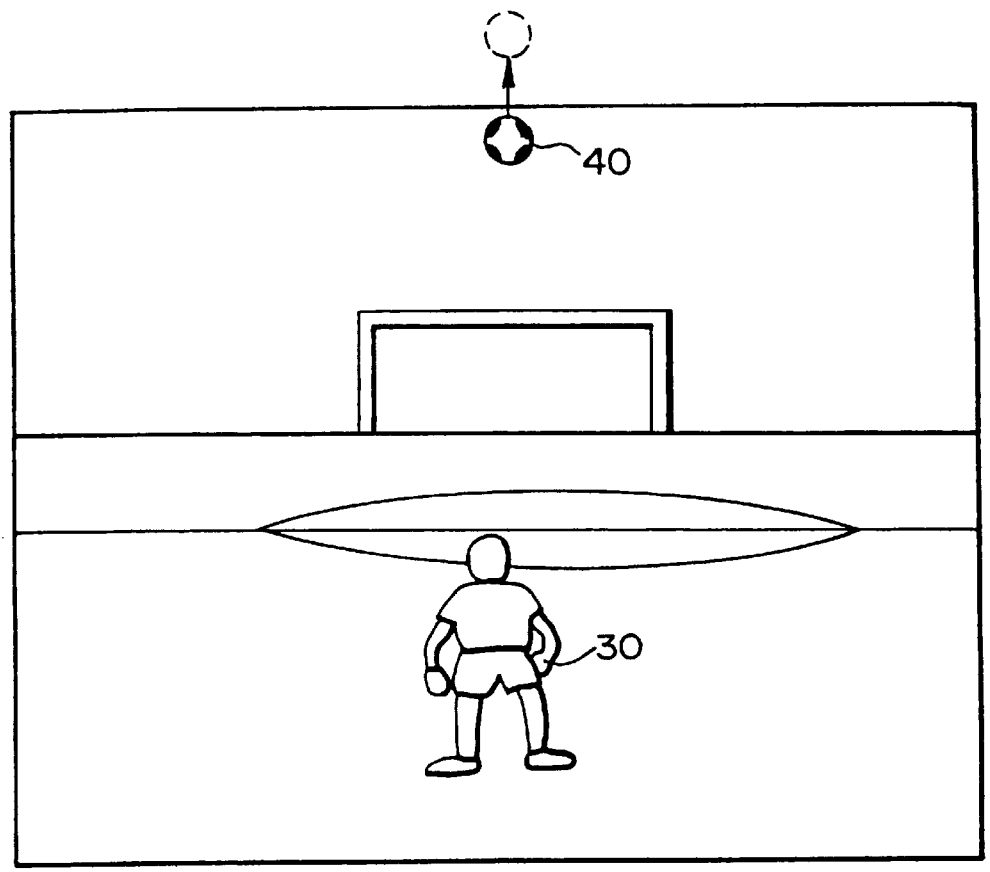
FIGS. 6A and 6B illustrate a technique by which the line-of-sight direction is changed within a certain range.

As shown in FIG. 6A, in the soccer simulation game, the ball 40 is often kicked upward by the player's game character 30. At this time, if the virtual camera 20 unconditionally follows the ball 40, the virtual camera 20 may be positioned under the ground as shown by G in FIG. 6B to provide an image of the kicked ball flying in the sky, giving an unnatural feeling and confusion to the player. If such an image of the ball 40 is repeated, the player will be disoriented.

Figure 6B:
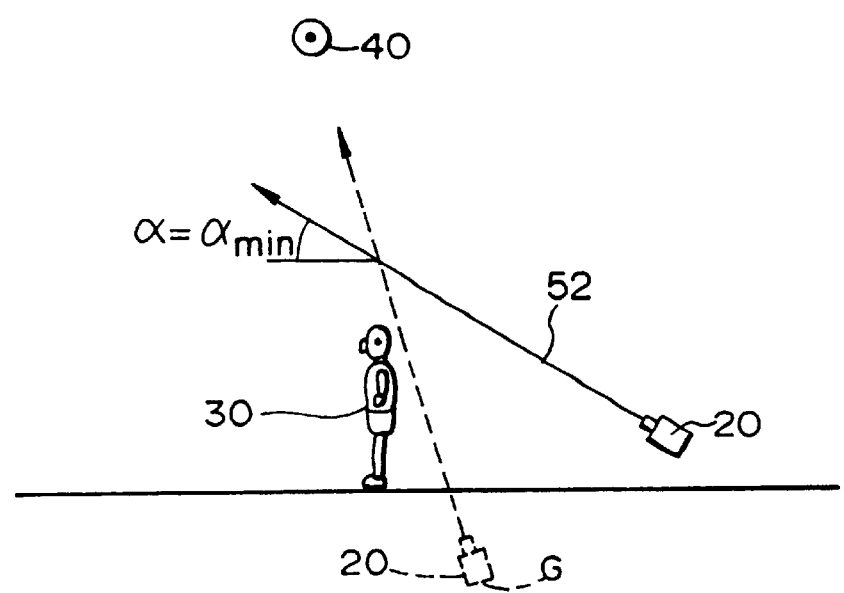

Therefore, the present embodiment provides a range within which the line-of-sight direction 52 of the virtual camera 20 is varied, so that the virtual camera 20 will not follow the ball 40 unconditionally when it is kicked upward. Particularly, as shown in FIG. 6B, the twist angle α of the virtual camera 20 has a lower limit $α_{min}$ (when it is assumed that the value α increases counter-clockwise). Thus, it can be effectively prevented that the virtual camera 20 is unnaturally positioned under the ground to give an unnatural feeling and confusion to the player.

The fifth feature of the present embodiment is that the viewpoint 50 and line-of-sight direction 52 of the virtual camera 20 are changed to project the player's game character 30 onto a first part (e.g. a lower part) of the screen and also project the ball 40 onto a second part (e.g. an upper part) of the screen when the gazing point of the virtual camera 20 is used as a reference point to divide the screen into the first and second parts.

Figure 7A:
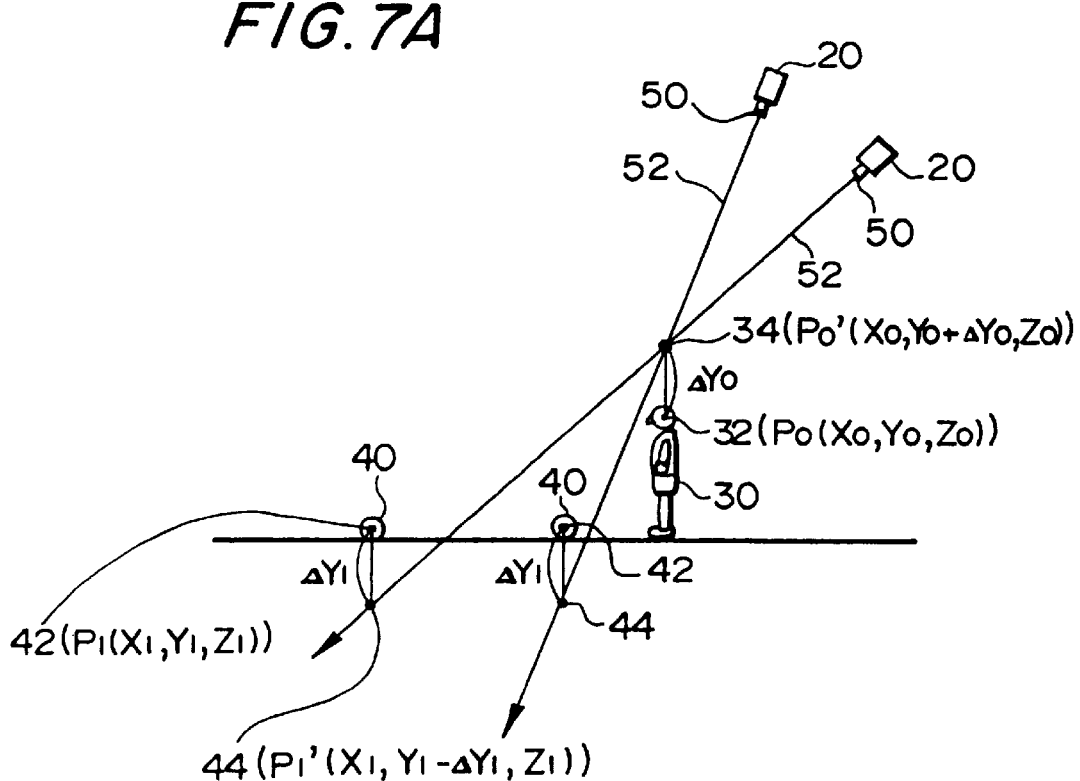
FIGS. 7A and 7B illustrate a technique by which the player's game character is displayed below the gazing point and the ball is displayed above the gazing point.
Figure 7B:
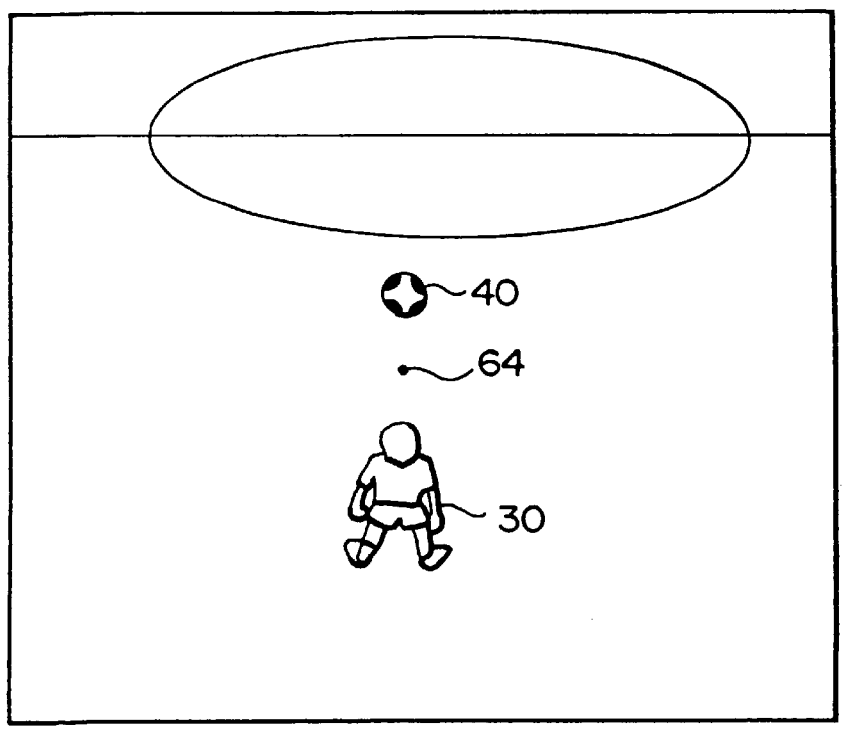

More particularly, as shown in FIG. 7, the line-of-sight direction 52 of the virtual camera 20 is always directed in a direction from a point 34 toward a point 44. The point 34 is located above a representative point 32 of the player's game character 30 by $\Delta Y_0$ while the point 44 is positioned below a representative point 42 of the ball 40 by $\Delta Y_1$. In this way, an image can be generated in which the player's game character 30 is always below the gazing point 64 and the ball 40 is always above the gazing point 64, as shown in FIG. 7B. It is thus ensured that the player's game character 30 and the ball 40 are displayed without hiding each other, or the player can always view both the player's game character 30 and ball 40 without any interposition. As shown in FIG. 7B, further, an image preferable for the game play can be generated since the positional relationship among the gazing point 64, the player's game character 30 and the ball 40 is stably maintained.

Although the first and second parts are respectively lower and upper parts of the screen in FIG. 7B, these parts may be any pair of parts such as left and right parts, upper left and lower right parts or lower and right parts.

Figure 8:
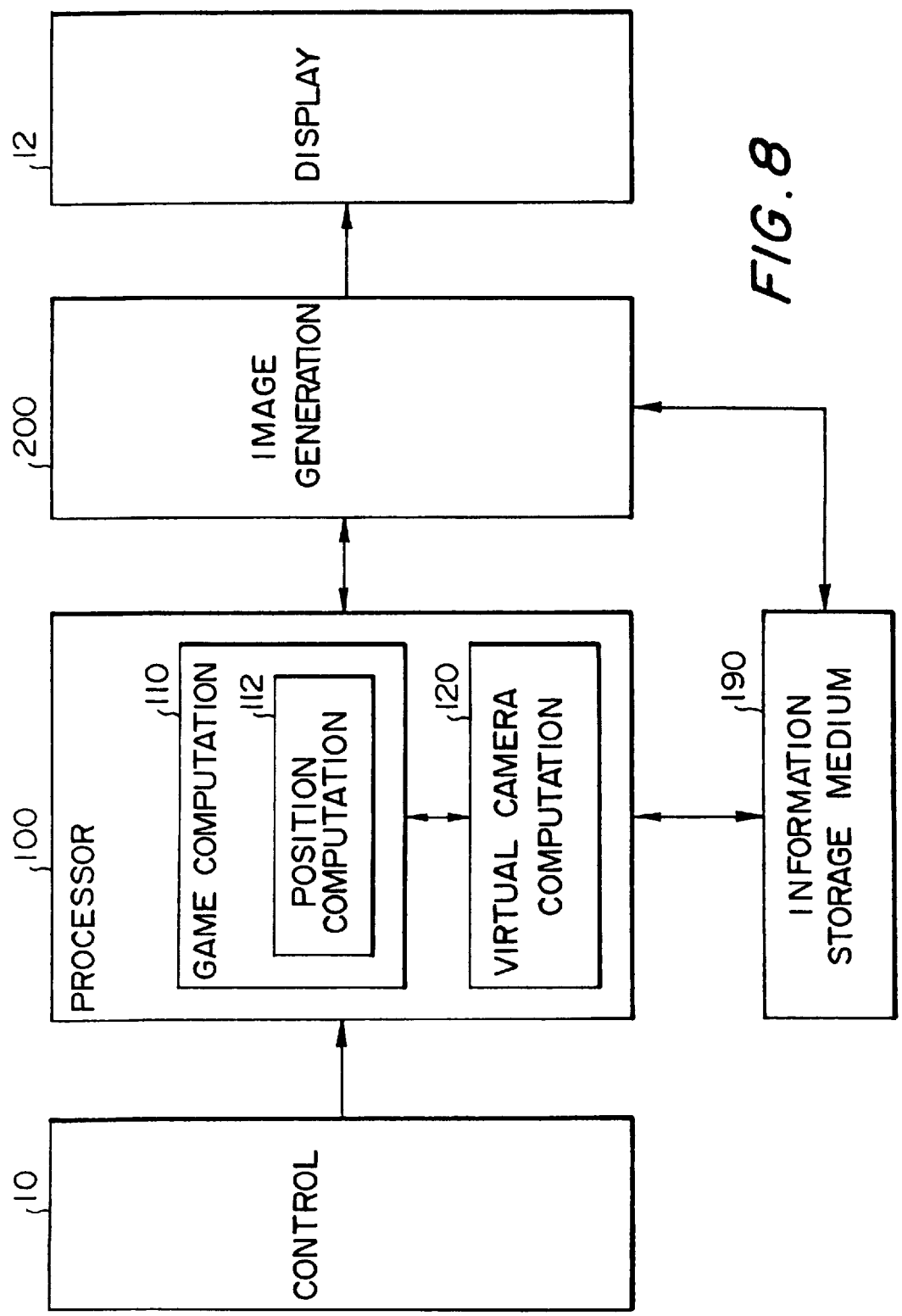
FIG. 8 is a functional block diagram of the present embodiment.

The arrangement of an image generating system according to the present embodiment will now be described. FIG. 8 shows a functional block diagram of this image generating system.

The image generating system comprises a control section 10 for inputting player's operation information into the system through buttons, levers, an acceleration pedal and a steering wheel or the like, and a processing section 100 for receiving the operation information from the control section 10.

This processing section 100 processes data for setting an object space in which a plurality of objects are arranged, based on the operation information and a given program and others. The processing section 100 may be formed by suitable hardware such as CPU.

The image generating system also comprises an image generating section 200 which generates an image as seen from a virtual camera within the object space. The image generating section 200 may be formed by suitable hardware such as CPU, digital signal processor (DSP), or application specific IC (ASIC) for image generation. An image generated by the image generating section 200 is displayed on a display 12.

The image generating system further comprises an information storage medium 190 which mainly stores programs, image data and so on. The information storage medium 190 may be formed by suitable means such as CD-ROM, game cassette, IC card, magnet-optical (MO) disk, floppy disk (FD), digital video disk (DVD), hard disk, or ROM. The processing and image generating sections 100, 200 perform various processes based on the information (including programs and data) from the information storage medium 190.

The processing section 100 comprises a game computation section 110 and a virtual camera computation section 120. The game computation section 110 processes data for progressing a game. It performs game mode setting, game procedure, determination of coordinates of objects and so on. In such a case, the process for determining the coordinates of the objects based on the operation information from the control section 10 and the programs is accomplished by a position computation section 112 in the game computation section 110. The coordinates of the player's game character and ball in each frame are outputted from the position computation section 112 toward the virtual camera computation section 120.

The virtual camera computation section 120 processes data for determining the viewpoint and line-of-sight direction of the virtual camera based on the coordinates of the player's game character and ball from the position computation section 112 and the program and data from the information storage medium 190.

The virtual camera computation section 120 processes data for enabling the virtual camera to follow the player's game character and for changing the viewpoint and line-of-sight direction of the virtual camera such that the player's game character and the ball will be projected onto the screen without hiding each other even if the distance between the player's game character and the ball is varied. As the distance between the player's game character and the ball decreases, the viewpoint of the virtual camera is changed to increase the distance between the viewpoint and the line passing through the player's game character and the ball, and also the line-of-sight direction of the virtual camera is directed toward the player's game character and the ball side. Processing of data for this operation is also performed by the virtual camera computation section 120. When the distance between the player's game character and the ball becomes smaller than the threshold value, the virtual camera computation section 120 processes data for enabling the player to see the ball through an open space of the player's game character, for limiting changing of the line-of-sight direction of the virtual camera to a certain range, or for projecting the player's game character and the ball respectively onto the lower and upper parts of the screen when the gazing point of the virtual camera is used as a reference point.

Figure 9:
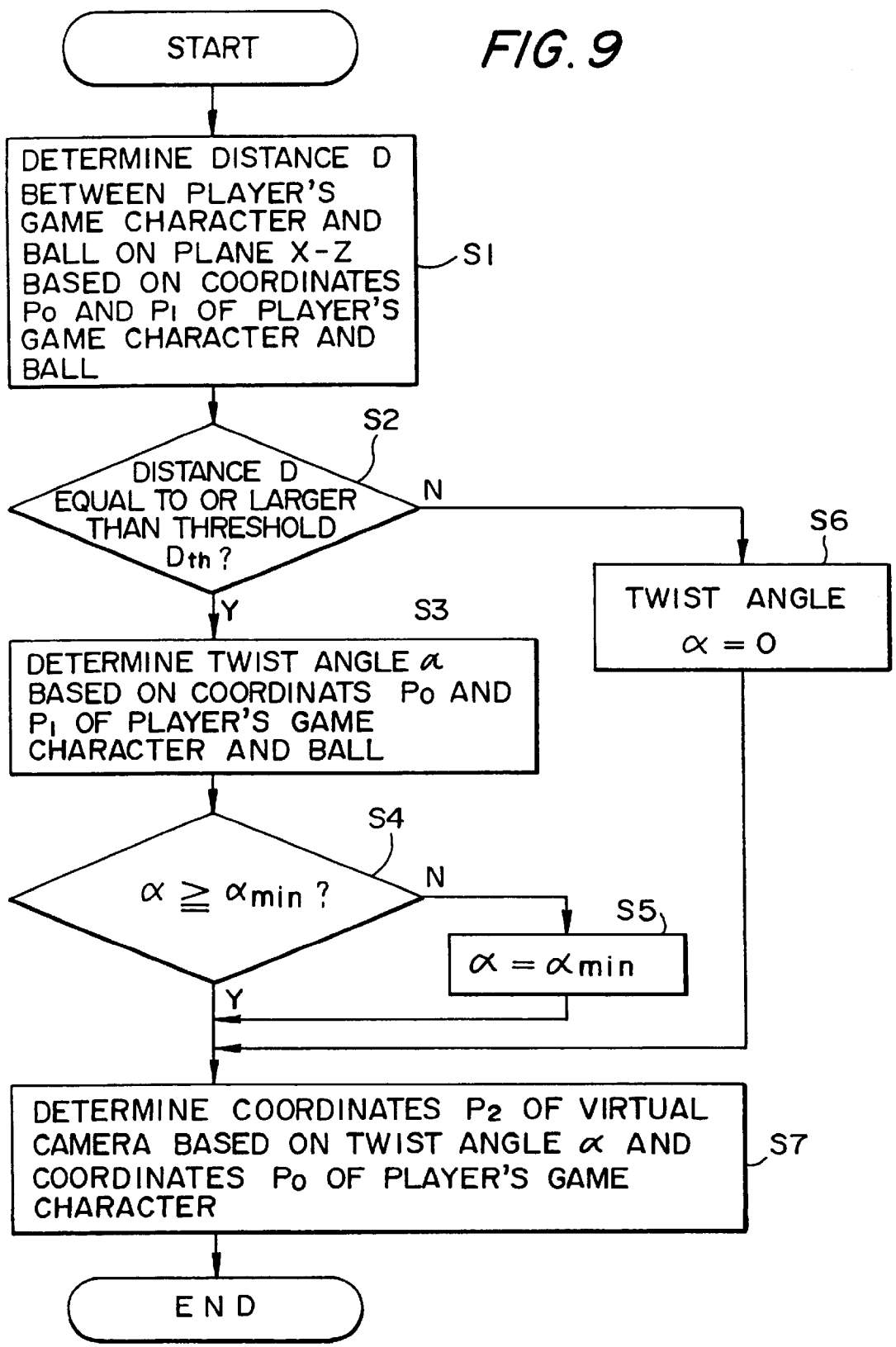
FIG. 9 is a flow chart illustrating an operation in the present embodiment.

The details of the operation of the present embodiment will be described with reference to the flow chart of FIG. 9 and FIG. 10.

Figure 10:
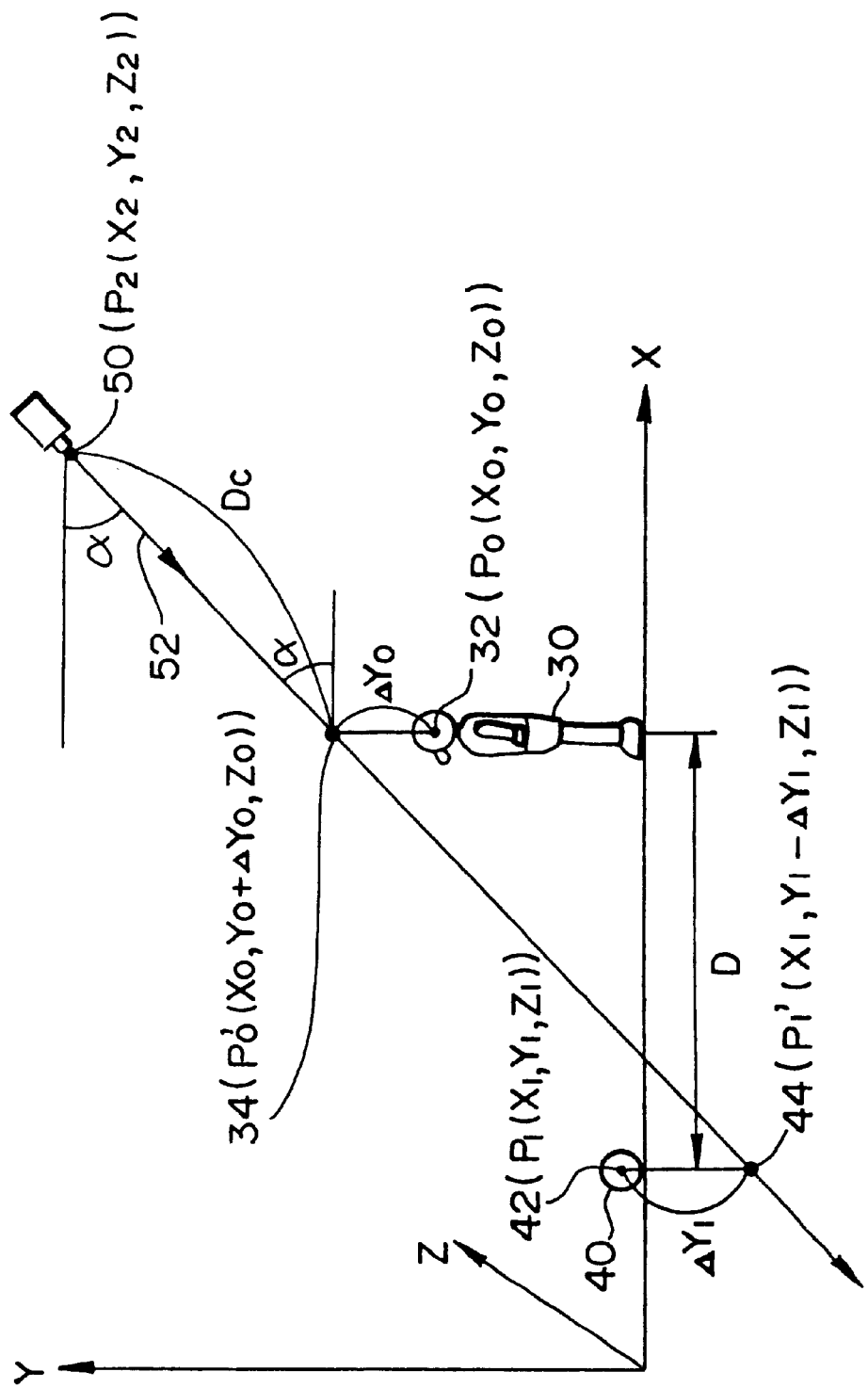
FIG. 10 illustrates another operation in the present embodiment.

As shown in FIG. 10, first of all, the distance D on the plane XZ is determined by the following formula (1) based on the coordinate $P_0$ of the player's game character 30 (i.e. the coordinate of the representative point 32) and the coordinate $P_1$ of the ball 40 (i.e. the coordinate of the representative point 42) (Step S1).

$$D=\{(X_0-X_1)^2+(Z_0-Z_1)^2\}^{+e,fra\ 1/2}+ee \quad (1)$$

For simplicity, it is now assumed that the player's game character 30 and ball 40 only move along the x-$_{axis}$.

It is then determined whether the distance D is equal to or larger than the threshold $D_{th}$ (step S2). If the distance D is equal to or larger than the threshold $D_{th}$, the twist angle $\alpha$ is determined by the following formula (2) based on the coordinates $P_0$ and $P_1$ of the player's game character 30 and ball 40 (Step S3).

$$\alpha=\tan^{-1}[\{(Y_0+\Delta Y_0)-(Y_1-\Delta Y_1)\}/(X_0-X_1)] \quad (2)$$

On the other hand, if the distance D is smaller than the threshold $D_{th}$, the twist angle $\alpha$ is set, for example, zero as shown by the following formula (3) (Step S6).

$$\alpha=0 \quad (3)$$

It is then determined whether the twist angle $\alpha$ is equal to or larger than the lower limit $\alpha_{min}$ (Step S4). If the value $\alpha$ is smaller than the lower limit $\alpha_{min}$, the value $\alpha$ is changed to the lower limit $\alpha_{min}$ (Step S5).

$$\alpha = \alpha_{min} \quad (4)$$

Based on the twist angle $\alpha$ thus determined and the coordinate $P_0$ of the player's game character 30, the coordinate $P_2(X_2, Y_2, Z_2)$ of the viewpoint 50 of the virtual camera 20 is determined according to the following formula (5) (Step S7).

$$X_2 = X_0 + D_c \times \cos \alpha$$

$$Y_2 = Y_0 + D_c \times \sin \alpha$$

$$Z_2 = Z_0 \quad (5)$$

where $D_c$ is a camera distance.

When the line-of-sight direction 52 (or twist angle $\alpha$) and the viewpoint 50 are determined according to the above formulas (2) and (5), the player's game character 30 and the ball 40 can be projected onto the screen without hiding each other even if the distance D is changed. In addition, as the distance D decreases, the viewpoint 50 can be shifted upward and the twist angle can be increased, as described in connection with FIGS. 4A and 4B. Furthermore, the player's game character 30 can be always below the gazing point 64 and the ball 40 can be always above the gazing point 64, as described in connection with FIGS. 7A and 7B.

If the distance D is smaller than the threshold $D_{th}$, the value $\alpha$ is set zero as shown in the above formula (3), for example, so that the ball 40 can be seen through the open space 31 between the legs of the player's game character 30, as described in connection with FIGS. 5A and 5B.

When the twist angle $\alpha$ is limited to be equal to or larger than the lower limit $\alpha_{min}$ as shown in the above formula (4), the virtual camera 20 will not be positioned under the ground to confuse the player, as described in connection with FIGS. 6A and 6B.

Figure 11:
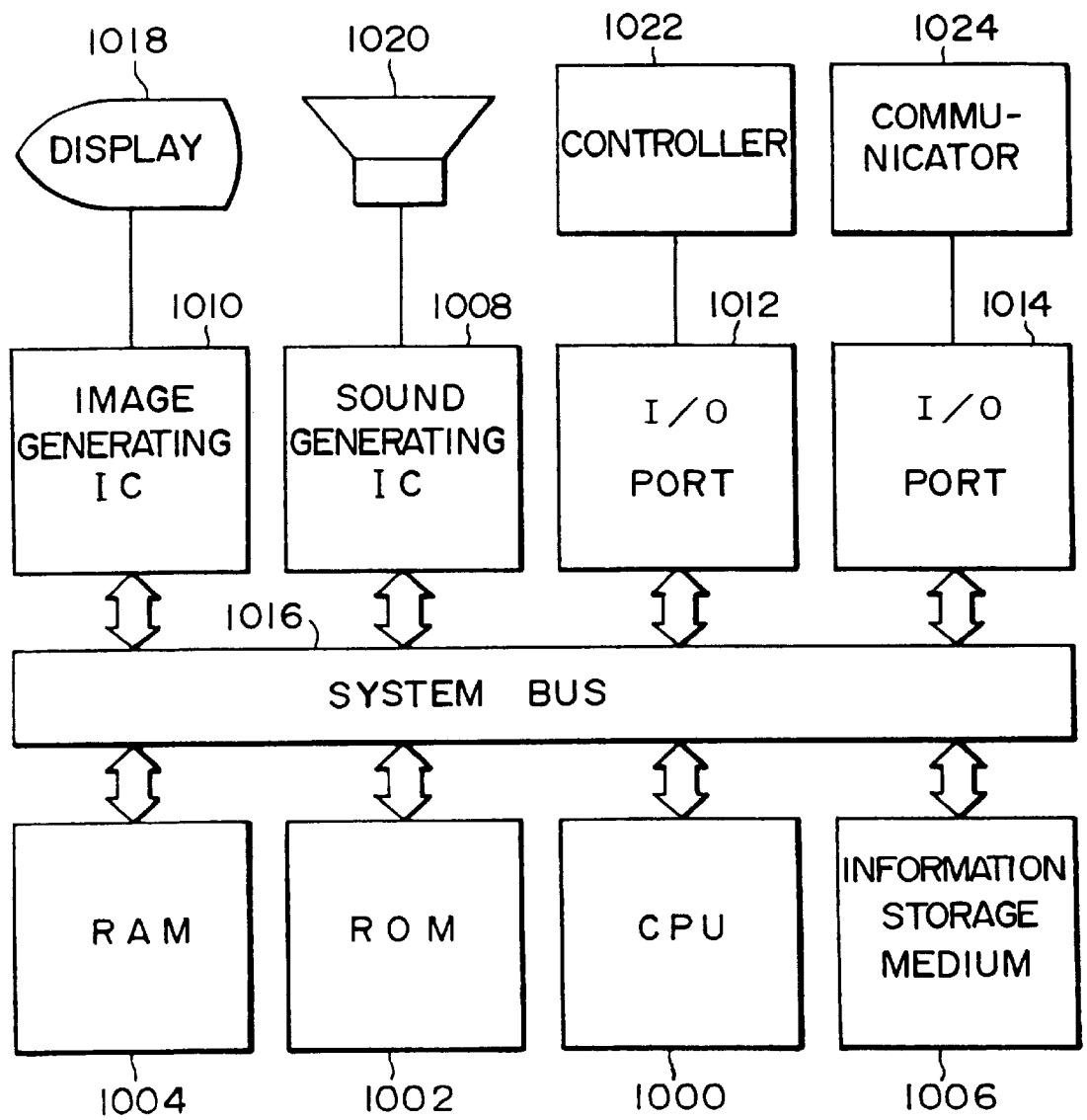
FIG. 11 shows an arrangement of hardware for realizing the present embodiment.

An arrangement of hardware which can realize the present embodiment will be described with reference to FIG. 11. The hardware comprises a CPU 1000, a ROM 1002, a RAM 1004, an information storage medium 1006, a sound generating IC 1008, an image generating IC 1010 and I/O ports 1012, 1014, all of which are interconnected together through a system bus 1016 for transmission/reception. The image generating IC 1010 is connected to a display 1018; the sound generating IC 1008 is connected to a speaker 1020; the I/O port 1012 is connected to a control device 1022; and the I/O port 1014 is connected to a communication device 1024.

The information storage medium 1006 stores mainly programs, image data used for representing objects, sound data and so on. For example, a domestic game system may include a CD-ROM, game cassette or DVD as an information storage medium for storing game programs and so on. An arcade game system may use a ROM or the like. In such a case, the information storage medium 1006 becomes the ROM 1002.

The control device 1022 corresponds to a game controller or control panel and is used for inputting the results of judgment performed by a player during progress of game into the system.

The CPU 1000 performs the control of the entire system and various data processings according to the programs stored in the information storage medium 1006, the system program (system initialization and the like) stored in the ROM 1002, input signals from the control device 1022 and so on. The RAM 1004 is a storage means used as a working area or the like for the CPU 1000 and stores given contents of the information storage medium 1006 and ROM 1002, the results of computation by the CPU 1000 and so on. A structure of data having a logical configuration as a table data or the like can be configured on the RAM or information storage medium.

Since the system includes the sound generating IC 1008 and the image generating IC 1010, the sounds and images of the game can be outputted in a preferred manner. The sound generating IC 1008 is an integrated circuit for generating game sounds such as effect sounds and background music based on the information stored in the information storage medium 1006 and ROM 1002. The generated game sounds are outputted through the speaker 1020. The image generating IC 1010 is an integrated circuit for generating pixel information to be outputted toward the display 1018 based on the image information from the RAM 1004, ROM 1002, information storage medium 1006 and so on. The display 1018 may be a so-called "head mount display (HMD)".

The communication device 1024 sends and receives the various information utilized in the game system to and from external means. The communication device 1024 may be connected to other game system for transmitting/receiving given information depending on the game programs or for transmitting/receiving the information of game programs and the like through a communication line.

Various processes described in connection with FIGS. 1–8 and 10 are realized by the information storage medium 1006 which stores the programs for performing such processes as shown in the flow chart of FIG. 9 and by the CPU 1000, image generating IC 1010, sound generating IC 1008 and others which are controlled according to the programs. The processes performed by the image generating IC 1010, sound generating IC 1008 and others may be performed by CPU 1000 or an all-purpose DSP in a software manner.

Figure 12A:
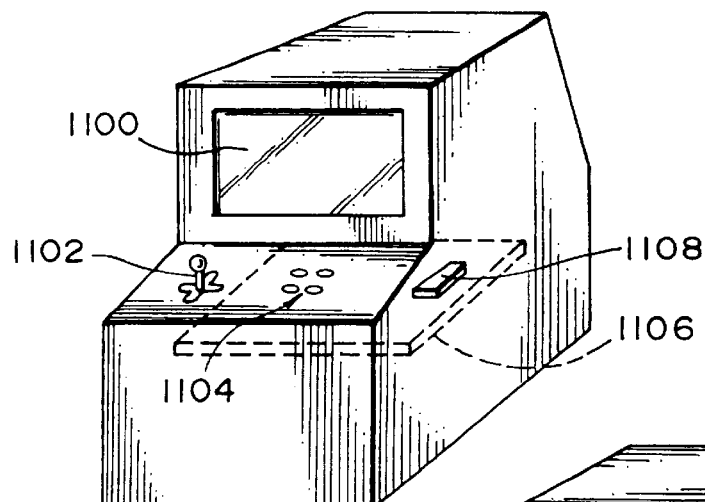
FIGS. 12A, 12B and 12C illustrate various system forms to which the present embodiment is applied.

FIG. 12A shows an arcade game system to which the present embodiment is applied. A player enjoys a game by operating a lever 1102, buttons 1104 and so on while viewing a game image displayed on a display 1100. A system board 1106 in the system comprises a CPU, an image generating IC, a sound generating IC and so on. A memory or information storage medium 1108 on the system board 1106 has stored various types of information, that is: information for causing the virtual camera to follow a first displayed object while changing at least one of the viewpoint and line-of-sight direction of the virtual camera based on positional information of the first and second displayed objects such that the first and second objects can be projected onto the screen without hiding each other even if the distance between the first and second displayed objects is changed; information for generating an image as seen from the virtual camera; information for changing the viewpoint of the virtual camera to increase the distance between the viewpoint and a line passing through the first and second displayed objects and for directing the line-of-sight direction of the virtual camera toward the first and second displayed objects side as the distance between the first and second displayed objects decreases; information for enabling the second displayed object to be seen through an open space of the first displayed object when the distance between the first and second displayed objects becomes smaller than a given threshold value; information for limiting changing of the line-of-sight direction of the virtual camera to a certain range; information for projecting the first and second displayed objects respectively onto the first and second parts of the screen when the gazing point of the virtual camera is used as a reference point to divide the screen into the first and second parts; and so on. These information will be called "stored information" hereinafter. The stored information includes at least one of program codes for performing the above processes, image information, sound information, object shape information, table data, list data, player information and so on.

Figure 12B:
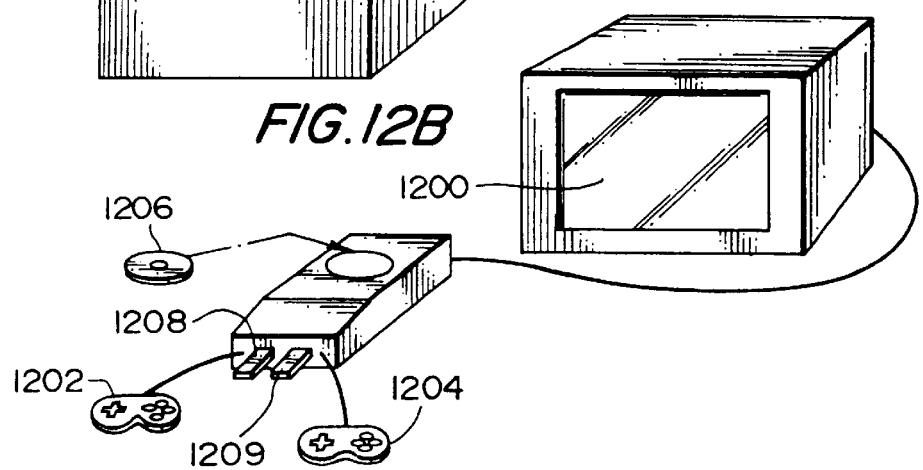

FIG. 12B shows a domestic game system to which the present embodiment is applied. Players enjoy a game by operating game controllers 1202 and 1204 while viewing a game image displayed on a display 1200. In such a case, the stored information has been stored in a CD-ROM 1202, IC cards 1208, 1209 and so on which are information storage media detachably mounted in the system.

Figure 12C:
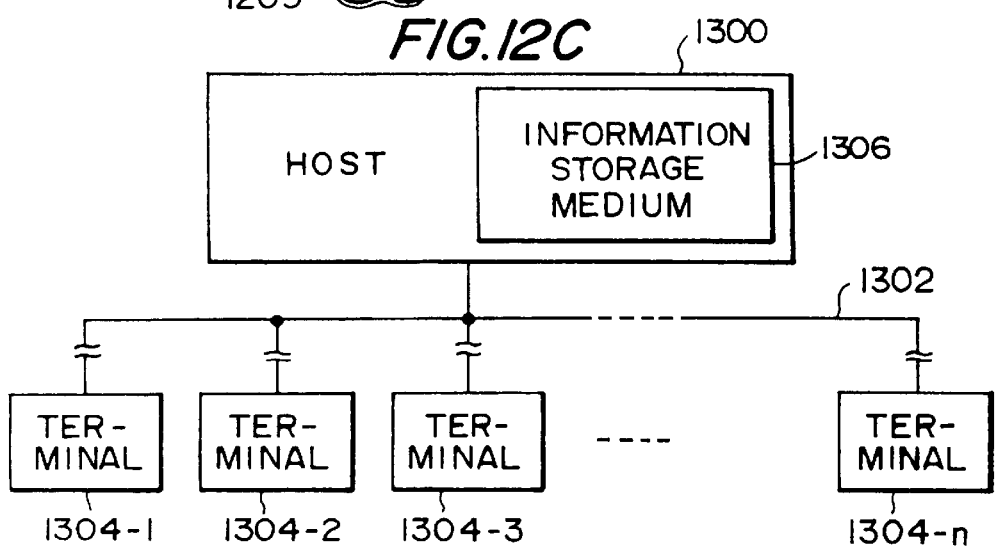

FIG. 12C shows another game system to which the present embodiment is applied. This game system comprises a host device 1300 and terminals 1304-1 through 1304-n which are connected to the host device 1300 through a communication line 1302. In such a case, the stored information has been stored, for example, in an information storage medium 1306 which may be any one of a magnetic disc device, magnetic tape device, memory an so on, all of which can be controlled by the host device 1300. If each of the terminals 1304-1 through 1304-n is a stand-alone machine which includes a CPU, an image generating IC and a sound generating IC to generate game images and game sounds, a game program for generating game images and game sounds and so on are delivered to each of the terminals 1304-1 through 1304-n. If each of the terminals 1304-1 through 1304-n is not a stand-alone machine and cannot generate game images and game sounds, the host device 1300 generates game images and game sounds which are in turn fed to all the terminals 1304-1 through 1304-n.

The present invention is not limited to the described embodiment, and can be implemented in various ways.

It is particularly desirable that such a technique as described in connection with FIGS. 4A, 4B, 7A and 7B is taken to change the viewpoint and line-of-sight direction of the virtual camera so that the first and second displayed objects can be projected onto the screen without hiding each other even if the distance between the first and second displayed objects is changed. However, the present invention is not limited to such a technique, but may be carried out in various other forms.

It is sufficient that both of the first and second displayed objects are displayed on the screen and it is allowable for them to be displayed with overlap in some techniques such as: a technique in which the viewpoint is changed to increase the distance between the viewpoint and a line passing through the first and second displayed objects while the line-of-sight direction is directed toward the first and second displayed objects side as the distance between the first and second displayed objects decreases; a technique in which the viewpoint and the line-of-sight direction are changed such that the first and second displayed objects are projected respectively onto the first and second parts of the screen when the gazing point of the virtual camera is used as a reference point to divide the screen into the first and second parts.

The present invention is particularly desirable when it is used in a sports simulation game using a ball as described in connection with the present embodiment, such as Rugby football game, ice hockey game, field hockey game, American football game, tennis game, baseball game and so on. Unlike the conventional sports simulation games in which an image is generated as seen from a third person view, the present invention can generate an image as seen from a first person view to be more preferable for the game play in which the virtual camera follows a particular displayed object. In such a case, the first displayed object may be a character coming on the game and the second displayed object may be a ball controllable by the character.

Figure 13A:
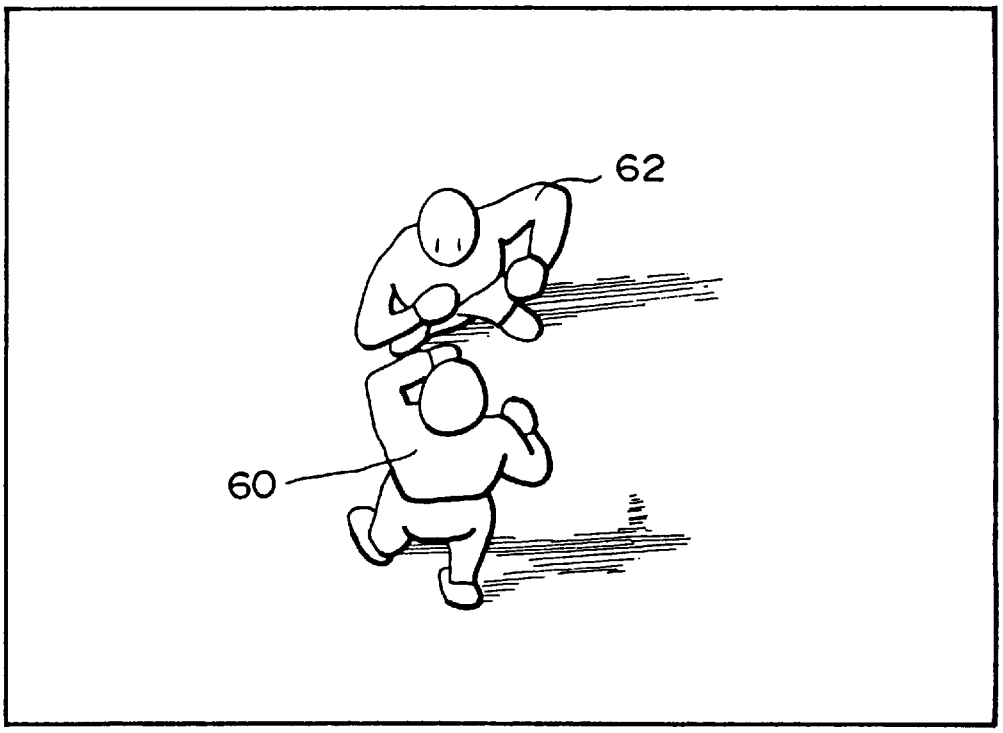
FIGS. 13A and 13B illustrate a fighting game to which the present invention is applied.

However, the present invention is not limited to such sports simulation games, but may be applied to various other games. FIG. 13A shows an image generated when the present invention is applied to a fighting game (person to person or tank to tank). In FIG. 13A, the first displayed object is a first game character 60 coming on the game while the second displayed object is a second game character 62 to fight against the first game character 60.

As shown in FIG. 13A, both the first and second game characters 60, 62 can be always displayed without hiding each other even if the distance between the first and second game characters 60, 62 is changed. Therefore, if the virtual camera follows the first game character 60, an image preferable for the game play can be generated.

Figure 13B:
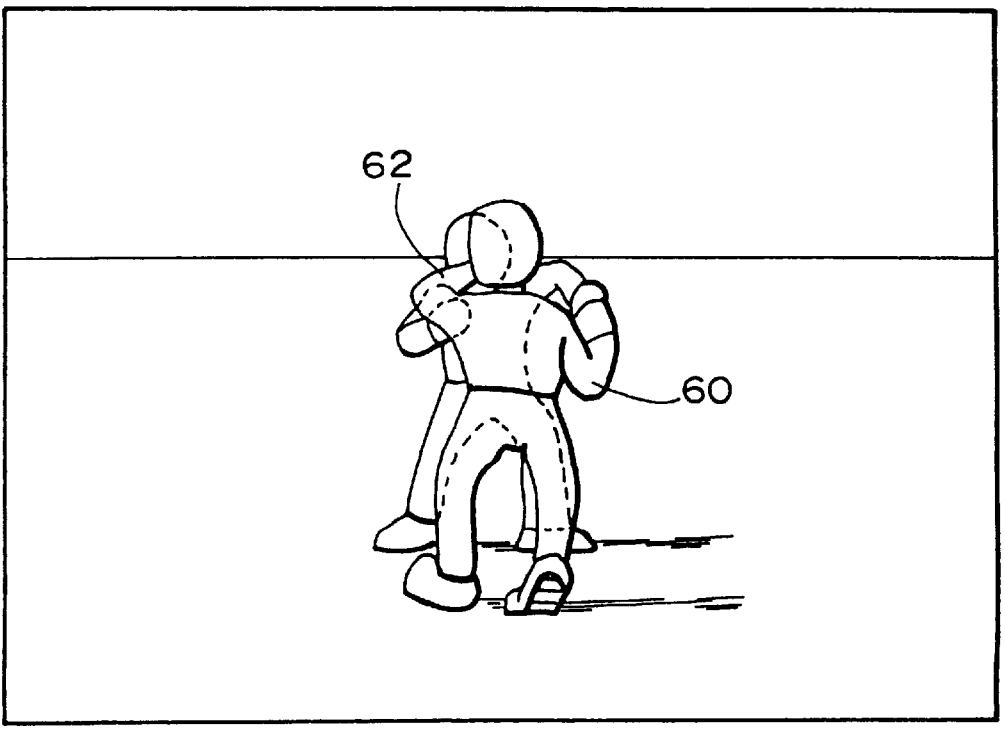

On the other hand, in such a case as shown in FIG. 13B, an image preferable for the game play cannot be generated since the first game characters 60 hides a part of the second game character 62.

Figure 14A:
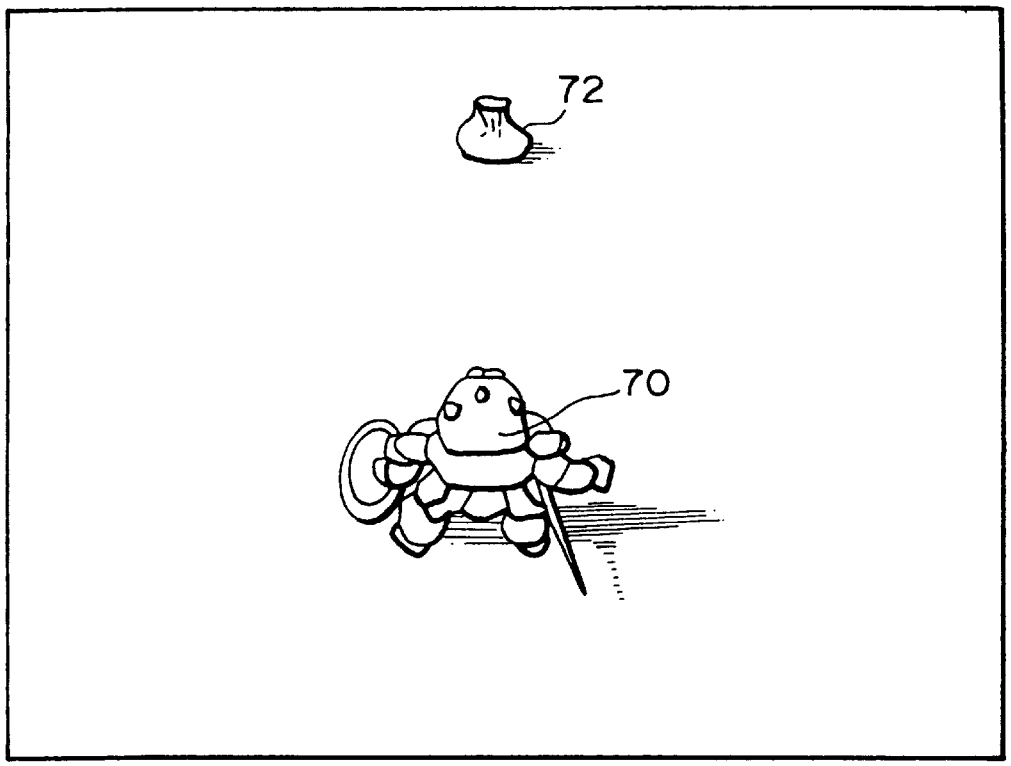
FIGS. 14A and 14B illustrate a role-playing game to which the present invention is applied.

FIG. 14A shows an image generated when the present invention is applied to a role-playing game. In FIG. 14A, the first displayed object is a game character 70 coming on the game while the second displayed object is an item 72 to be obtained by the character 70.

As shown in FIG. 14A, even if the distance between the game character 70 and the item 72 is changed, both the game character 70 and item 72 can be always displayed without hiding each other. Therefore, an image preferable for the game play can be generated when the virtual camera follows the game character 70.

Figure 14B:
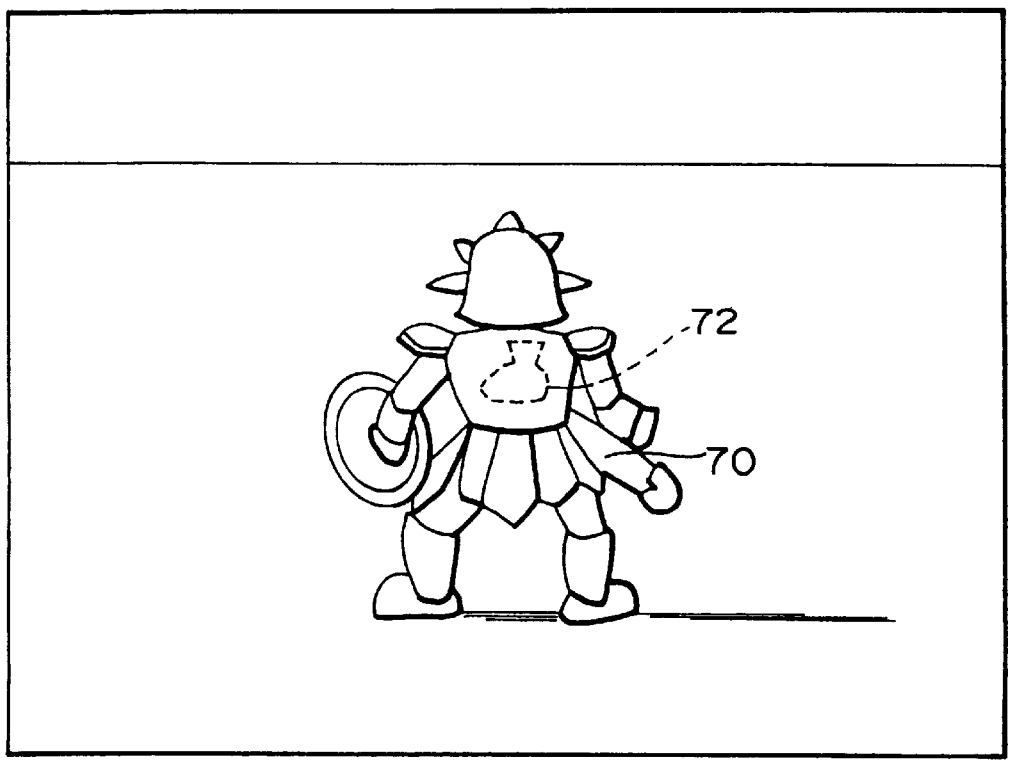

On the other hand, in such a case as shown in FIG. 14B, an image preferable for the game play cannot be generated since the item 72 is hidden by the game character 70.

The present invention can be applied not only to the domestic and arcade game systems, but also to various other systems such as a big-sized attraction system in which a number of players can enjoy a game, a personal computer, a multimedia terminal, a system board for generating images and so on.

What is claimed is:

1. An image generating system for generating an image as seen from a virtual camera in an object space in which at least first and second displayed objects are disposed, said image being a projected image onto a screen, said image generating system comprising:

means for causing said virtual camera to follow said first displayed object, and also for changing at least one of the viewpoint and line-of-sight direction of said virtual camera based on positional information of said first and second displayed objects such that said first and second displayed objects are projected onto said screen without hiding each other even if the distance between said first and second displayed objects is changed; and means for generating an image as seen from said virtual camera.

2. The image generating system as defined in claim 1, wherein as the distance between said first and second displayed objects decreases, the viewpoint of said virtual camera is changed to increase the distance between the viewpoint and a line passing through said first and second displayed objects, and also the line-of-sight direction of said virtual camera is directed toward said first and second displayed objects side.

3. An image generating system for generating an image as seen from a virtual camera in an object space in which at least first and second displayed objects are disposed, said image being a projected image onto a screen, said image generating system comprising:

means for changing the viewpoint of said virtual camera to increase the distance between the viewpoint and a line passing through said first and second displayed objects, and also for directing the line-of-sight direction of said virtual camera toward said first and second displayed objects side, as the distance between said first and second displayed objects decreases; and means for generating an image as seen from said virtual camera.

4. The image generating system as defined in claim 2, wherein when said object space has a coordinate system in which the X-axis, Y-axis and Z-axis are perpendicular to each other, the Y-coordinate of the viewpoint of said virtual camera and a twist angle which is an angle between the line-of-sight direction of said virtual camera and the plane XZ are changed depending on the distance between said first and second displayed objects.

5. The image generating system as defined in claim 3, wherein when said object space has a coordinate system in which the X-axis, Y-axis and Z-axis are perpendicular to each other, the Y-coordinate of the viewpoint of said virtual camera and a twist angle which is an angle between the line-of-sight direction of said virtual camera and the plane XZ are changed depending on the distance between said first and second displayed objects.

6. The image generating system as defined in claim 2, wherein when said object space has a coordinate system in which the X-axis, Y-axis and Z-axis are perpendicular to each other, the Z-coordinate of the viewpoint of said virtual camera and a pan angle which is an angle between the line-of-sight direction of said virtual camera and the plane XY are changed depending on the distance between said first and second displayed objects.

7. The image generating system as defined in claim 3, wherein when said object space has a coordinate system in which the X-axis, Y-axis and Z-axis are perpendicular to each other, the Z-coordinate of the viewpoint of said virtual camera and a pan angle which is an angle between the line-of-sight direction of said virtual camera and the plane XY are changed depending on the distance between said first and second displayed object.

8. The image generating system as defined in claim 1, wherein at least one of the viewpoint and line-of-sight direction of said virtual camera is changed such that said second displayed object can be seen through an open space of said first displayed object when the distance between said first and second displayed objects is less than a given threshold value.

9. The image generating system as defined in claim 3, wherein at least one of the viewpoint and line-of-sight direction of said virtual camera is changed such that said second displayed object can be seen through an open space of said first displayed object when the distance between said first and second displayed objects is less than a given threshold value.

10. The image generating system as defined in claim 1, wherein changing of the line-of-sight direction of said virtual camera is limited to a given range.

11. The image generating system as defined in claim 3, wherein changing of the line-of-sight direction of said virtual camera is limited to a given range.

12. The image generating system as defined in claim 1, wherein at least one of the viewpoint and line-of-sight direction of said virtual camera is changed such that said first displayed object is projected onto a first part of said screen and said second displayed object is projected onto a second part of said screen when a gazing point of said virtual camera is used as a reference point to divide said screen into said first and second parts.

13. The image generating system as defined in claim 3, wherein at least one of the viewpoint and line-of-sight direction of said virtual camera is changed such that said first displayed object is projected onto a first part of said screen and said second displayed object is projected onto a second part of said screen when a gazing point of said virtual camera is used as a reference point to divide said screen into said first and second parts.

14. An image generating system for generating an image as seen from a virtual camera in an object space in which at least first and second displayed objects are disposed, said image being a projected image onto a screen, said image generating system comprising:

means for causing said virtual camera to follow said first displayed object, and also for changing at least one of the viewpoint and line-of-sight direction of said virtual camera such that said first displayed object is projected onto a first part of said screen and said second displayed object is projected onto a second part of said screen when a gazing point of said virtual camera is used as a reference point to divide said screen into said first and second parts; and means for generating an image as seen from said virtual camera.

15. The image generating system as defined in claim 1, wherein said virtual camera follows said first displayed object with inertia.

16. The image generating system as defined in claim 3, wherein said virtual camera follows said first displayed object with inertia.

17. The image generating system as defined in claim 14, wherein said virtual camera follows said first displayed object with inertia.

18. The image generating system as defined in claim 1, wherein said first displayed object represents a game character and said second displayed object represents a ball controllable by said game character in a game which is played by using said image generated by said image generating system.

19. The image generating system as defined in claim 3, wherein said first displayed object represents a game character and said second displayed object represents a ball controllable by said game character in a game which is played by using said image generated by said image generating system.

20. The image generating system as defined in claim 14, wherein said first displayed object represents a game character and said second displayed object represents a ball controllable by said game character in a game which is played by using said image generated by said image generating system.

21. The image generating system as defined in claim 1, wherein said first displayed object represents a first game character and said second displayed object represents a second game character who fights against said first game character in a game which is played by using said image separated by said image generating system.

22. The image generating system as defined in claim 3, wherein said first displayed object represents a first game character and said second displayed object represents a second game character who fights against said first game character in a game which is played by using said image generated by said image generating system.

23. The image generating system as defined in claim 14, wherein said first displayed object represents a first game character and said second displayed object represents a second game character who fights against said first game character in a game which is played by using said image generated by said image generating system.

24. The image generating system as defined in claim 1, wherein said first displayed object represents a game character and said second displayed object represents an item to be obtained by said game character in a game which is played by using said image generated by said image generating system.

25. The image generating system as defined in claim 3, wherein said first displayed object represents a game character and said second displayed object represents an item to be obtained by said game character in a game which is played by using said image generated by said image generating system.

26. The image generating system as defined in claim 14, wherein said first displayed object represents a game character and said second displayed object represents an item to be obtained by said game character in a game which is played by using said image generated by said image generating system.

27. An information storage medium to be used in an image generating system for generating an image as seen from a virtual camera in an object space in which at least first and second displayed objects are disposed, said image being a projected image onto a screen, said information storage medium comprising:

information for causing said virtual camera to follow said first displayed object, and also for changing at least one of the viewpoint and line-of-sight direction of said virtual camera based on positional information of said first and second displayed objects such that said first and second displayed objects are projected onto said screen without hiding each other even if the distance between said first and second displayed objects is changed; and information for generating an image as seen from said virtual camera.

28. An information storage medium to be used in an image generating system for generating an image as seen from a virtual camera in an object space in which at least first and second displayed objects are disposed, said image being a projected image onto a screen, said information storage medium comprising:

information for changing the viewpoint of said virtual camera to increase the distance between the viewpoint and a line passing through said first and second displayed objects, and also for directing the line-of-sight direction of said virtual camera toward said first and second displayed objects side, as the distance between said first and second displayed objects decreases; and information for generating an image as seen from said virtual camera.

29. An information storage medium to be used in an image generating system for generating an image as seen from a virtual camera in an object space in which at least first and second displayed objects are disposed, said image being a projected image onto a screen, said information storage medium comprising:

information for causing said virtual camera to follow said first displayed object, and also for changing at least one of the viewpoint and line-of-sight direction of said virtual camera such that said first displayed object is projected onto a first part of said screen and said second displayed object is projected onto a second part of said screen when a gazing point of said virtual camera is used as a reference point to divide said screen into said first and second parts; and information for generating an image as seen from said virtual camera.

* * * * *